Sept. 21, 1926.  
W. F. KISTINGER  
1,600,678  
SPRING TENSION DEVICE FOR AUTO TIRE CHAINS  
Filed Jan. 23, 1925 2 Sheets-Sheet 2
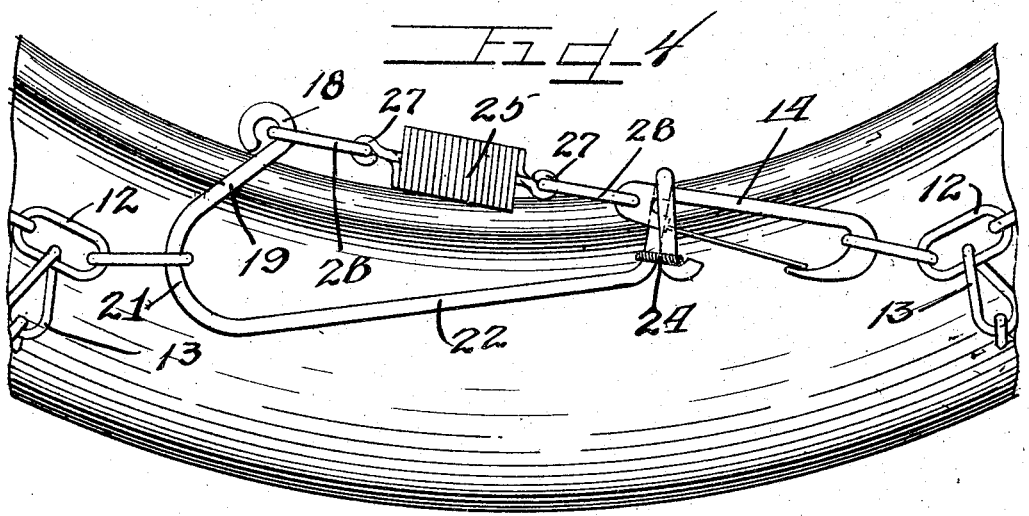
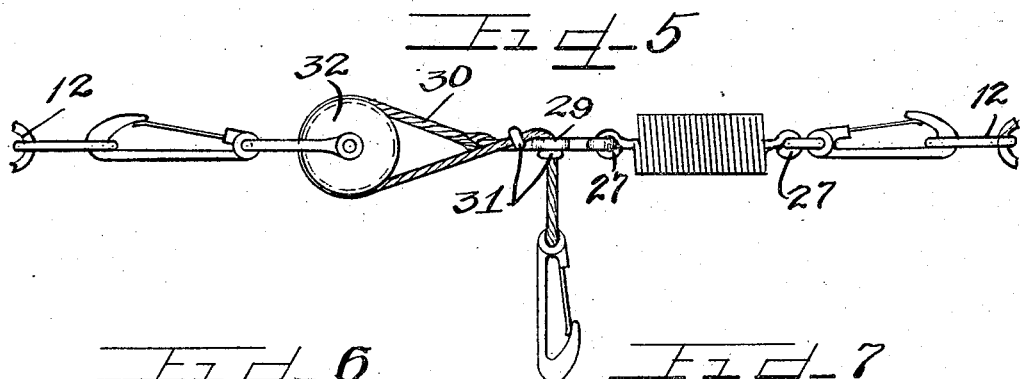
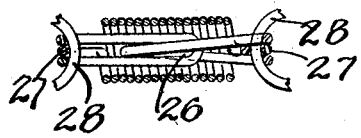

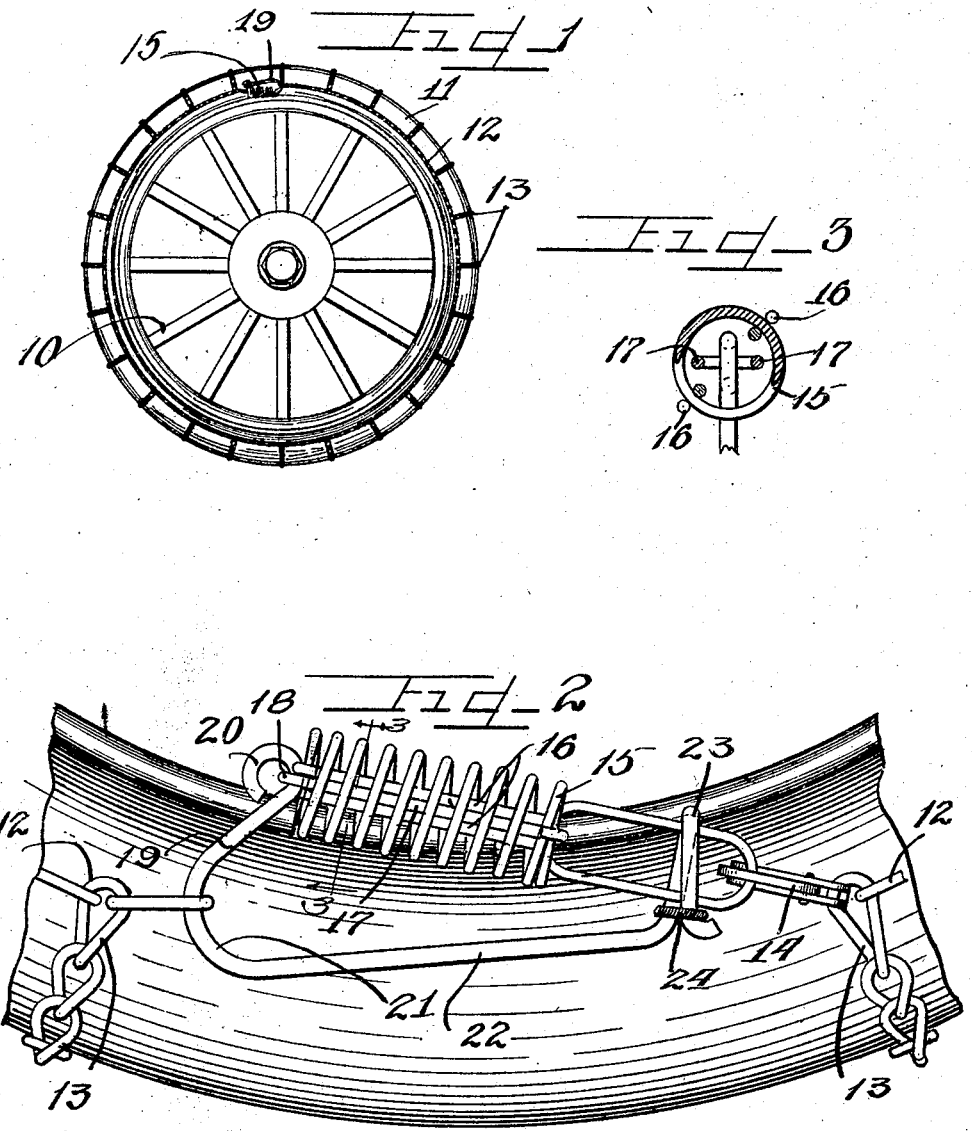

Patented Sept. 21, 1926.

1,600,678

UNITED STATES PATENT OFFICE.

WILLIAM F. KISTINGER, OF CORNELL, ILLINOIS.

SPRING-TENSION DEVICE FOR AUTO TIRE CHAINS.

Application filed January 23, 1925. Serial No. 4,144.

This invention relates to tensioning devices for anti-skid tire chains used with automobile wheels whereby the tire chains will be yieldingly held to the tire without the possibility of spring breakage allowing the tire chain to come off the wheel.

It is an object of this invention to provide an improved form of tire chain tensioning device of the type wherein a spring serves to tension the side chains and thereby hold the cross chains closely and yieldingly against the periphery of the tire. Heretofore various forms of spring tensioning devices have been proposed, and the present invention is an improvement thereover in providing both improved fastening means and in providing means preventing release of the tire chains should the spring proper break under the severe service it is called upon to sustain.

Other and further important objects of this invention will be apparent from the disclosures in the specification and the accompanying drawings.

This invention (in a preferred form) is illustrated in the drawings and hereinafter more fully described.

On the drawings:

Figure 1 is a view of an automobile wheel and tire with a tire chain mounted thereon by means of a device embodying features of this invention.

Figure 2 is an enlarged view of the preferred form of this invention.

Figure 3 is a section on the line 3—3 of Figure 2.

Figure 4 is an enlarged detail of a slightly modified form of this invention.

Figure 5 is a view of another modification.

Figure 6 is a sectional detail of the spring used in the modifications of Figures 4 and 5.

Figure 7 is an enlarged detail of the rope clamp of Figure 5.

As shown on the drawings:

The numeral 10 refers to an ordinary type of automobile wheel upon which is mounted a pneumatic tire 11. A tire chain comprising a pair of circumferential chains 12 arranged on either side of the tire have a plurality of cross links 13 passing over the periphery of the tire to give added traction thereto on slippery surfaces. Owing to the necessity of frequent placement and removal the side chains cannot be continuous, and some form of releasable fastening is required.

The present invention contemplates incorporating a restrained spring in the fastening in order to cause the side and cross chains to hug the tire, without sufficient force being applied to chafe the tire or prevent proper creeping of the tire chains to evenly distribute the wear on the tire caused thereby. In the preferred embodiment of this invention a snap fastening 14 is provided for the actual fastening joining the side chains and this snap is connected through the center of a coil spring 15 by a link and the rods 16 to the far end thereof. Similar rods 17 lead through the spring from the rear or right hand end, emerging at the left end and forming an eye or pivot 18. It will be evident that tension on the eye 18 will therefore compress the spring 15 up to the point where the successive coils abut against each other so that the spring has a definite limiting movement and breakage thereof will not release the connection through the spring.

A bent lever 19 is formed with an eye 20 to engage the spring eye 18 and the bend thereof 21 engages the other end of the side chain and is so formed as to stress the spring 15 when the straight portion 22 of the lever is moved into the position of Figure 2. The end of this straight portion of the lever is bent towards the spring position and provided with an open loop 23 adapted to hook about the side chain connection or snap fastening to retain the lever in place. Inasmuch as the stressed spring tends to open the lever, the return bend or loop 23 is an effective securing means not likely to become unfastened. To render the assembly still more secure a looped coil spring 24, is stretched over the open hook of the lever.

In use, the side chains would be engaged together by the snap after first inserting the bent lever in one end of the side chain in an open position. By pulling the lever over to engage about the snap or side chain an initial tension can be set up in the side chains to retain them in proper position.

In the modification of Figure 4 the change from the above described structure comprises the use of a spring 25 under tension, the extensibility of the spring being limited by interengaging loops 26 in the center of the spring and engaging each eye 27 thereof, the eyes being connected by links 28 to the lever and snap previously described.

The modification of Figure 5 utilizes the spring 25 previously described connected by a snap fastening 32 at one end to the side chain 12, the other end carrying a rope wedge 29 having one end of a rope 30 attached thereto. The free end of the rope has a series of stops or shoulders 31 secured thereto together with a snap at its end and is passed over a pulley 32 attached to the other end of the side chain by means of another snap. Drawing upon the rope until the spring 25 is properly tensioned and then slipping the rope into the rope wedge allows one of the collars 31 to abut against the side of the wedge to give a secure fastening. A pull in the direction of the wedge opening will free the rope whereas increased tension on the rope only wedges it tighter. The snap on the free end of the rope may be connected to either side chain 12 if rendered desirable by accident or breakage of parts.

I am aware that many changes may be made, and numerous details of construction may be varied through a wide range without departing from the principles of this invention, and I therefore do not purpose limiting the patent granted hereon, otherwise than necessitated by the prior art.

The above tensioning devices are used not just as a connection between the ends of a tire chain, but are used as a means of keeping the slack out of all anti-skid chains where they are using the regular connecting hook, thereby preventng the noise of slapping chains, and not hindering their efficiency or injuring the tires.

I claim as my invention:

1. A tire chain tensioning device comprising a coiled spring connected to one end of the chain, a bent return lever having one end passed through the other end of said chain and pivotally connected thereto, said lever being so formed that the bend thereof impresses increased strain on said spring when the shank of said lever is moved into its final position, a return hook formed on the free end of said lever adapted to engage about the tire chain at the opposite end of the spring, and permits the yield of said spring as pull is put on chains.

2. A tire chain tensioning device comprising a coiled spring connected to one end of the chain, a bent return lever having one end passed through the other end of said chain and pivotally connected thereto, said lever being so formed that the bend thereof impresses increased strain on said spring when the shank of said lever is moved into its final position, a return hook formed on the free end of said lever adapted to engage about the tire chain at the opposite end of the spring, and auxiliary resilient means adapted to retain the bent lever in its closed position.

In testimony whereof I have hereunto subscribed my name.

WILLIAM F. KISTINGER.